Jan. 7, 1941.    R. ELMS    2,227,894

ELECTRIC MOTOR

Filed Oct. 27, 1938

Inventor
Robert Elms
by
Attorney

Patented Jan. 7, 1941

2,227,894

UNITED STATES PATENT OFFICE 2,227,894

ELECTRIC MOTOR

Robert Elms, London, England

Application October 27, 1938, Serial No. 237,309
In Great Britain January 5, 1938

6 Claims. (Cl. 172—278)

This invention relates to electric motors of the synchronous alternating current type, and is especially applicable to motors for clocks, electricity meters and also for other purposes.

The object of the invention is to provide an improved electric motor of the type indicated above.

The invention consists in the combination of parts set forth in the claims appended hereto.

Referring now to the accompanying drawing,

Figure 1 shows in cross-section an electric motor constructed according to the invention, while

Figure 5 shows a modified arrangement of stator and rotor, while

Figure 6 shows an end elevation of a device for permitting rotation of the rotor in one direction only, while

Figure 1:
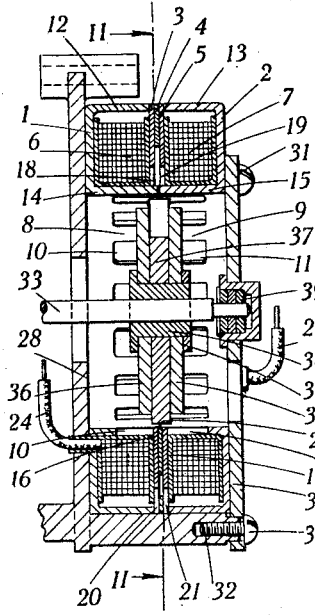

In carrying the invention into effect, according to one form, the stator of the motor, in the present example, comprises two annular members 1 and 2 (Figures 1 and 2) of channel section, three flat annular members 3, 4 and 5 and two windings 6 and 7 which are assembled together and mounted on a frame as hereinafter described.

The annular channel-sectioned members 1 and 2 are provided with sets of teeth forming salient poles 8 and 9, which are spaced apart at equal intervals, the poles in each annular member numbering fifteen.

The annular channel-sectioned members 1 and 2 are co-axially arranged with the poles 8 and 9 in alignment with one another, the end surfaces of the poles either abutting against one another or being separated by a slight clearance.

The interpolar spaces 10 and 11 are of greater width than the width of the poles 8 and 9.

Figure 2:
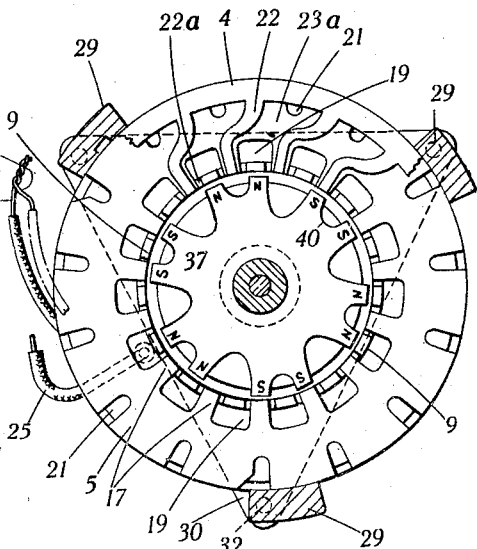
Figure 2 shows a vertical section on the line II—II of Figure 1.

The axial lengths of the cylindrical walls 12 and 13 of the annular channel-sectioned members 1 and 2 are shorter than the axial overall lengths of the cylindrical walls 14 and 15 of these members, and between adjacent ends of the former walls the outer rims of the flat annular members 3, 4 and 5 are interposed. The annular members 3 and 5 are of the same shape and are provided on their inner peripheries with equally spaced teeth 16 and 17, the number of teeth in each member being fifteen. The widths of the teeth 16 and 17 on the annular members 3 and 5 are less than that of the interpolar spaces 18 and 19 on these members. The outer peripheries of the annular members 3 and 5 are each provided with fifteen open-ended slots 20 and 21 spaced as shown in Figure 2. The annular member 4 is arranged between the annular members 3 and 5, and is provided with fifteen curved teeth 22 which are of slightly less width than the teeth 16 and 17 and are spaced at their inner ends to correspond to the spacing of the latter teeth.

The teeth 16, 17 and 22 on the annular members 3, 5 and 4 when assembled form laminated poles 23 which project into the interpolar spaces 10 and 11 of the annular channel-sectioned members 1 and 2 as shown, circumferential air gaps 22a being formed between the laminated poles 23 and the poles 8 and 9. The ends of the laminated poles 23 and the inner faces of the poles 8 and 9 lie upon a circle concentric with the axis of the rotor to be hereinafter described.

The arrangement of the annular members 3, 4 and 5 as above described forms ventilating ducts 23a for keeping the stator cool, these ducts at their outer ends opening into the inner ends of the slots 20 and 21 and at their inner ends into the interpolar spaces 18 and 19 of the members 3 and 5.

Figure 4:
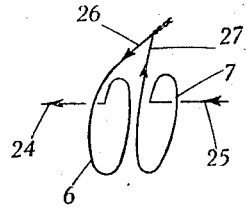
Figure 4 shows a diagram illustrating the method of winding the stator windings.

The windings 6 and 7 are located within the annular channel-sectioned members 1 and 2. The inner ends 24 and 25 of the windings being connected to a source of alternating current, while their outer ends 26 and 27 are joined together. The windings are wound to give a flow of current in opposite directions—that is, viewed from the right hand end of Figure 1, the winding 7 is laid in anti-clockwise direction, while the winding 6, viewed from the left hand end of Figure 1 is laid in the clockwise direction, the current thus flowing out of the outer end 27 and into the outer end 26, as shown in Figure 4, and vice versa, according to the alternation of the current.

The annular channel-sectioned members 1 and 2 with the windings 6 and 7 and the annular members 3, 4 and 5 are mounted in a frame 28 provided with three arms 29, and these members are clamped in position by means of an end plate 30 and screws 31 engaging in screw-threaded holes 32 in the arms 29. In order to enable the annular members 3, 4 and 5 to be tightly clamped between the cylindrical walls 12 and 13 of the annular channel-sectioned members 1 and 2, it is preferable to arrange for a slight clearance between the ends of the aligned poles 8 and 9 when the parts are tightly clamped.

The rotor element, in the present example, comprises a shaft 33, a brass flanged sleeve 34, a washer 35, two brass plates 36 and a permanent magnet 37. The shaft 33 is rotatably mounted at one end in a bearing 39 on the end plate 30 and at its other end in a second bearing, not shown, on the frame 28. On the shaft 33 is rigidly fixed the flanged sleeve 34 on which the side plates 36 and the permanent magnet 37 are rigidly clamped in position by means of the washer 35 over which the end of the sleeve 34 is riveted.

The permanent magnet 37 is provided with six groups 40 of poles, each group consisting of two poles of the same polarity. The groups alternate in polarity and are equally spaced on the magnet 37. The ratio of the number of poles and/or pole groups on the stator to the number of poles and/or pole groups on the rotor should preferably be an odd integer. In the present case the number of pole groups on the stator is thirty, and the number of pole groups on the rotor is six so that the ratio is five. The pitch of the poles in the pole groups on the rotor may be equal to, or approximately equal to twice the pitch of the poles on the stator, i. e., equal to the pitch of the poles 8 or the poles 9.

By the arrangement of stator and rotor hereinbefore described, during one half-cycle the poles 8 and 9 are all of the same polarity, and during the same half-cycle the laminated poles 23 are also all of the same polarity which is opposite to that of the poles 8 and 9. The magnetic flux in the stator in one half-cycle passes from the poles 8 and 9 outwards in opposite directions, round the channel members 1 and 2 and then combines as it passes radially inwards through the annular members 3, 4 and 5 to the laminated poles 23 and from these poles across the air gaps 22a to the poles 8 and 9 again, while in the other half-cycle it passes from the laminated poles 23 through the annular members 3, 4 and 5 radially outwards and then splits up and passes outwards round the channel-sectioned members 1 and 2 to the poles 8 and 9 and thence to the laminated poles 23.

The operation of the motor is similar to other known motors of this type. In the present example the rotor is provided with brass plates 36 on each side of the permanent magnet 37 which increases the inertia of the rotor to such an extent that it cannot start rotating automatically when the circuit through the windings 6 and 7 of the stator is closed, but must be started by spinning it by hand.

When synchronism is attained the rotor element moves in one half-cycle through a distance equal to the distance between two consecutive stator poles, and as such poles are always of opposite polarity, the poles of the rotor are repelled as they leave the poles of the stator opposite to them and are simultaneously attracted by the stator poles which they next approach, and as the rotor poles leave these stator poles the polarity of the latter changes so that the rotor poles are now repelled by them and simultaneously attracted by the next stator poles, and so on.

Figure 5:
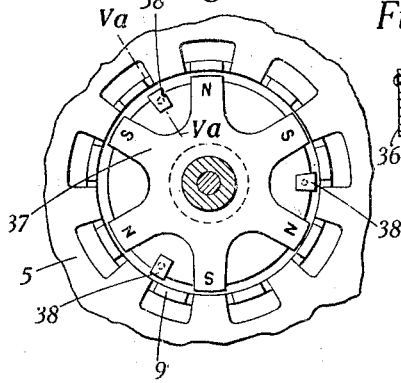
Figures 3, 5A:
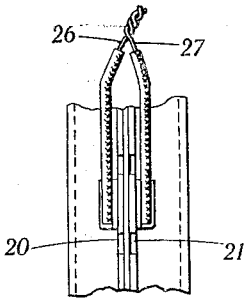
Figure 3 shows a part side elevation of the stator of the motor illustrated in Figures 1 and 2.
Figure 5a is a part section through the line Va—Va on Figure 5.

In Figures 5 and 5a an arrangement is shown in which the permanent magnet of the rotor is provided with six single poles and is self starting on closure of the circuit through the stator windings. The stator poles and polar groups in this case number eighteen, the arrangement of the stator being otherwise as above described. The rotor element in this case is provided with a single thin brass plate 36 which is rigidly attached to the permanent magnet 37 in a similar manner to the previous arrangement, and to this brass disc three soft-iron pieces 38 are riveted so that they are symmetrically disposed and midway between adjacent poles. The thickness of the pieces 38 is preferably slightly greater than the thickness of the magnet 37 as shown in Figure 5a, while their width is less than the width of the poles as shown in Figure 5. The pieces 38 ensure immediate starting of the rotor when the circuit through the windings 6 and 7 is closed.

Figure 6:
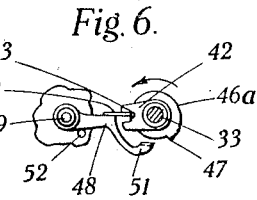
Figure 7:
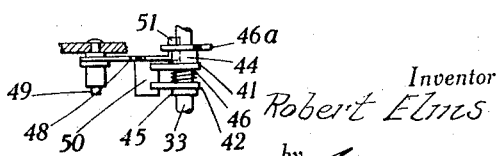
Figure 7 shows a plan of same.

In Figures 6 and 7 a device is illustrated which ensures that the rotor can only rotate in one predetermined direction. In this device two arms 41 and 42 are loosely mounted on the rotor shaft 33. These arms have notches 43 at their free ends and are pressed against collars 44 and 45 by means of a light helical spring 46. The collars 44 and 45 are rigidly fixed to the shaft 33. Further, a disc 46a provided with a tooth 47 is also fixed rigidly to the shaft 33.

On the frame of the motor is pivotally mounted an arm 48 on a pin 49. The arm 48 carries a laterally projecting lug 50 which engages with the notches 43 in the arms 41 and 42.

So long as the rotor shaft 33 revolves in the direction of the arrow shown in Figure 6, the parts remain in the position illustrated in this figure, the lug 50 of the arm 48 being in engagement with the notches 43 of the arms 41 and 42 and the arm 48 being in contact with a stop 52 on the motor frame, while the collars 44 and 45 slip on the arms 41 and 42. If, however, the rotor shaft 33 commences to rotate in the opposite direction to that of the arrow shown in Figure 6, the arms 41 and 42 are swung in the clockwise direction by the friction between them and the collars 44 and 45, so that the end 51 of the arm 48 engages with the tooth 47 on the disc 46 and prevents further rotation of the shaft 33 in this direction.

Modifications in detail and arrangement within the scope of the appended claims may be made in the examples hereinbefore described.

What I claim is:

1. A synchronous electric motor having a stator element and a rotor element, one of these elements having in combination plane annular disk means having salient poles for the inner periphery thereof, annular members each formed with an annular channel arranged one on each side of said annular disk means and having salient poles in aligned and abutting relation with each other on their inner peripheries, said latter poles alternating with the poles on the plane annular disk means, and windings arranged in the channels of the annular members for energizing said poles from a source of alternating current so that at any instant said aligned poles are of the same polarity and of opposite polarity to said poles on said disc means.

2. A synchronous electric motor having a stator element and a rotor element, one of these elements having in combination plane annular disk means having salient poles on the inner periphery thereof and having ventilating ducts for said salient poles, annular members each formed with an annular channel and arranged one on each side of said annular disk means and having salient poles in aligned and abutting relation with each other, said latter poles alternating with the poles on the annular disk means, and windings arranged in the channels of the annular members for energizing said poles from a source of alternating current so that at any instant said aligned poles are of the same polarity and of opposite polarity to that of said poles on said disc means.

3. A synchronous electric motor having a stator element and a rotor element, one of these elements having in combination a plurality of plane annular disk means having salient poles formed on the inner periphery thereof, annular members each formed with an annular channel and disposed one on each side of said annular disk means and having salient poles in aligned and abutting relation with one another, said latter poles alternating with the poles on the annular disk means, and windings in said annular channel members, said windings being connected to an alternating current source for energizing said poles so that at any instant said aligned poles are of the same polarity and of opposite polarity to that of said poles on said disc means.

4. A synchronous electric motor having a stator element and a rotor element, one of these elements having in combination plane annular disk means having salient poles on the inner periphery thereof, said annular disk means being also formed with ventilating ducts for said salient poles, annular members formed with an annular channel and arranged one on each side of said plane annular disk means and having salient poles in aligned and abutting relation with one another and alternating with the poles on the plane annular disk means, and windings arranged in the channels of the annular members, said windings being connected to a source of alternating electric current acting to energize said poles so that at any instant the polarity of said aligned poles is of the same polarity and of opposite polarity to that of the poles of said disc means.

5. A synchronous electric motor having a stator element and a rotor element, one of these elements having in combination plane annular disc means having salient poles on the inner periphery thereof, annular members of channel section having the peripheral walls of said channels facing each other in aligned relation and clamping the outer periphery of said disc means between their outer peripheral walls, said annular channel members having aligned salient poles in abutting relation on their inner peripheries and said aligned salient poles alternating with the salient poles on said disc means and said latter poles being disposed in the interpolar spaces of said aligned poles, together with windings disposed in said channels of said annular members for energizing said poles from a source of alternating current so that at any instant said aligned poles are of the same polarity and of opposite polarity to that of the salient poles on said disc means.

6. A synchronous electric motor having a stator element and a rotor element, one of said elements having in combination a plurality of annular disc means comprising outer members and an intermediate member disposed between said outer members, said outer members having slots on their outer peripheries and salient poles on their inner peripheries and said intermediate member having a narrow peripheral ring partially covering said slots and having salient poles narrower and longer than the poles of said outer members and projecting inwardly from said peripheral ring so that on assembly of said annular disc means ventilating ducts are formed for the salient poles of said disc members, annular members of channel section having the peripheral walls of said channels facing each other in aligned relation and clamping the outer peripheries of said disc means between their outer peripheral walls, said annular channel members having aligned salient poles in abutting relation on their inner peripheries and said aligned salient poles alternating with the salient poles on said disc means and said latter salient poles being disposed in the interpolar spaces of said aligned salient poles, together with windings disposed in said channels of said annular members for energizing said poles from an alternating source of current so that at any instant said aligned poles are of the same polarity and of opposite polarity to that of said salient poles on said disc means.

ROBERT ELMS.